Dec. 18, 1945.　　A. E. SCHUBERT ET AL　　2,391,274
CONTROL FOR RECORD HANDLING AND COPYING APPARATUS
Filed May 21, 1943　　　　3 Sheets-Sheet 1

Alvin E. Schubert
Harvey P. Hintz
Harlow J. Stettner
INVENTORS

BY Newton M Perrins
George A. Gillette
ATTORNEYS

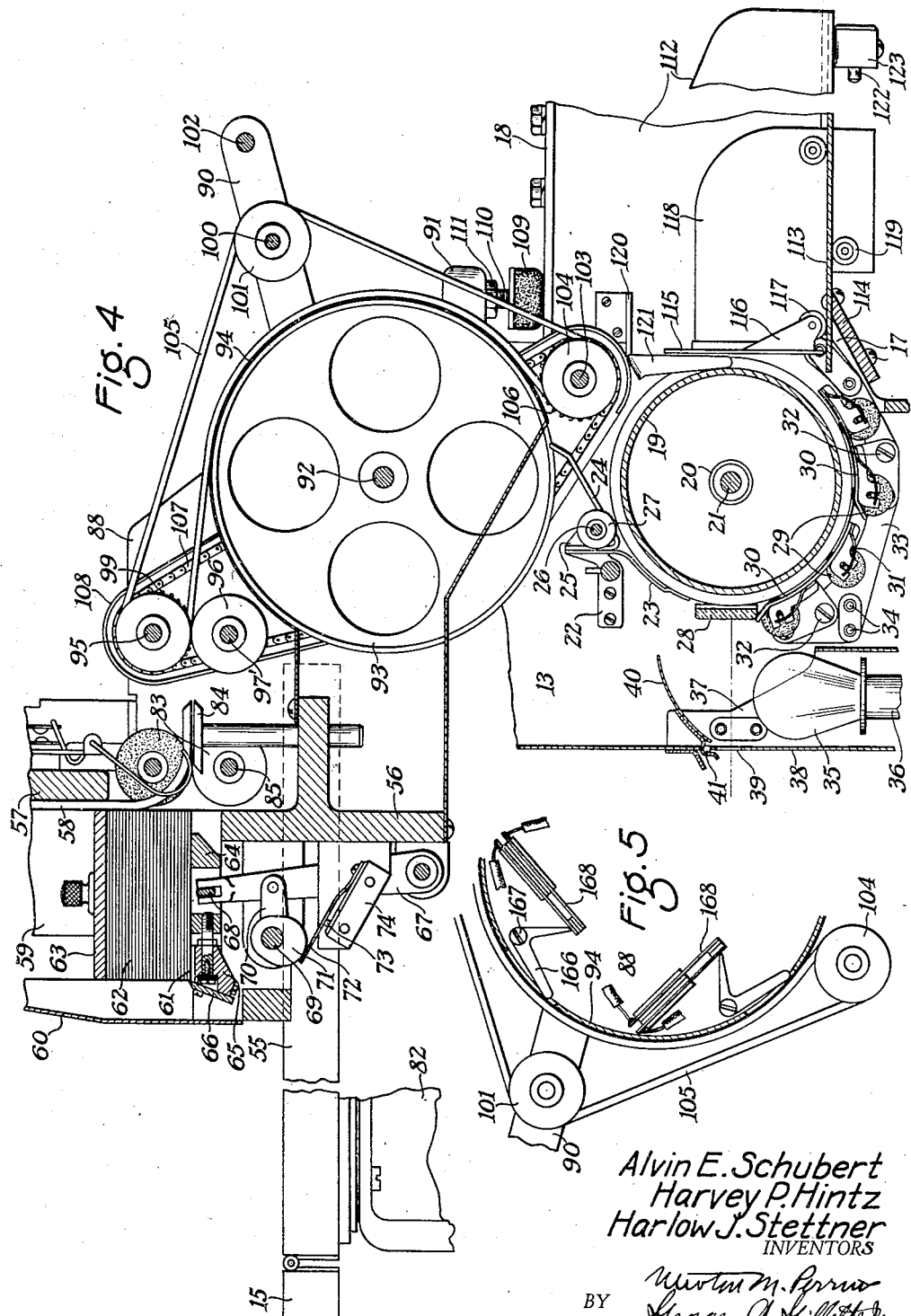

Dec. 18, 1945.    A. E. SCHUBERT ET AL    2,391,274
CONTROL FOR RECORD HANDLING AND COPYING APPARATUS
Filed May 21, 1943    3 Sheets-Sheet 3
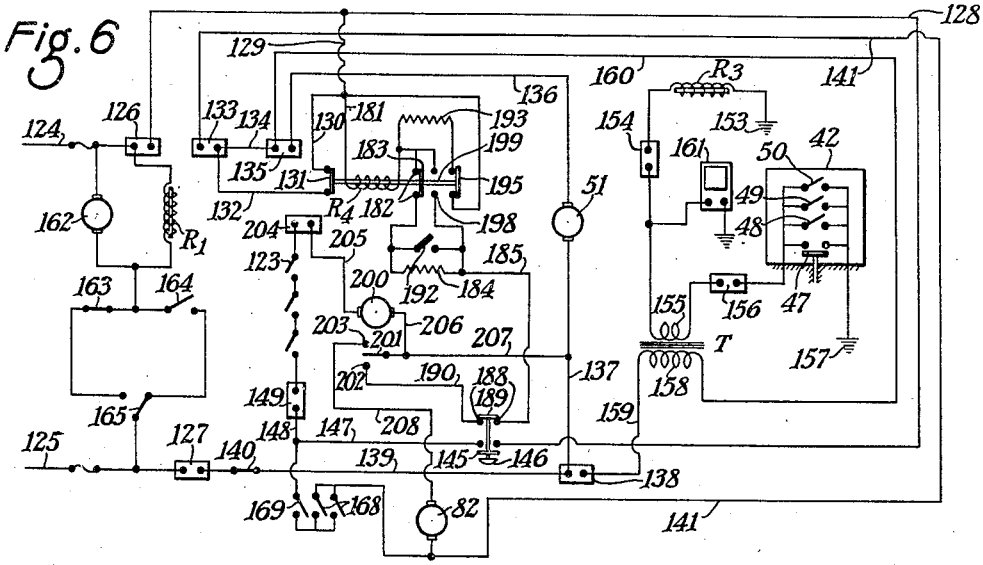
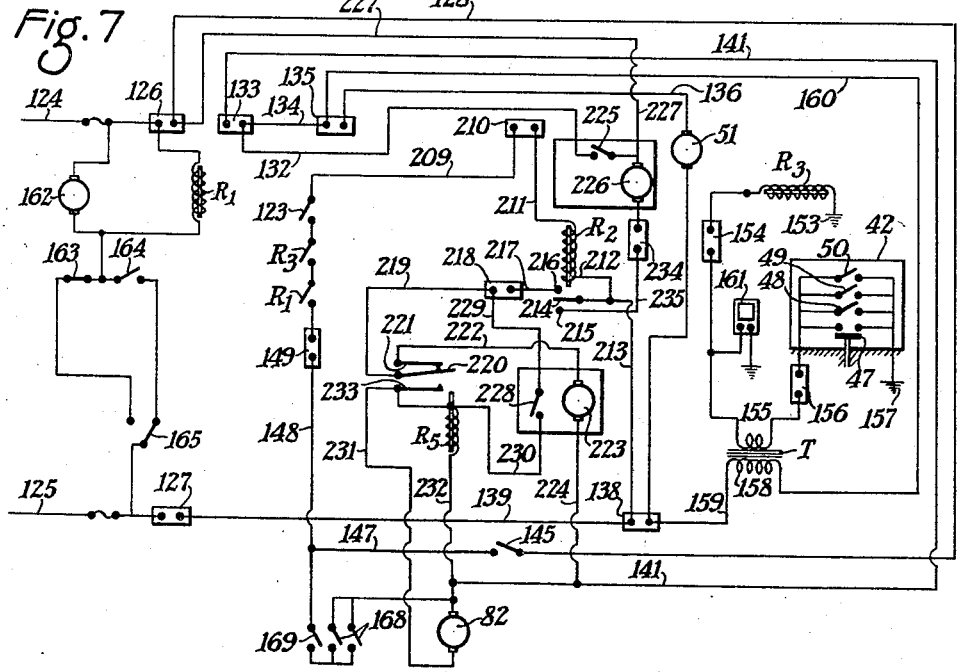
Alvin E. Schubert
Harvey P. Hintz
Harlow J. Stettner
INVENTORS
BY
ATTORNEYS Patented Dec. 18, 1945

2,391,274

UNITED STATES PATENT OFFICE 2,391,274

CONTROL FOR RECORD HANDLING AND COPYING APPARATUS

Alvin E. Schubert, Harvey P. Hintz, and Harlow J. Stettner, Rochester, N. Y., assignors to Eastman Kodak Company, Rochester, N. Y., a corporation of New Jersey Application May 21, 1943, Serial No. 487,918

27 Claims. (Cl. 88—24)

The present invention relates to a control for a record handling and copying apparatus and more particularly to a sequential control means operative during starting and stopping of said apparatus to maintain operation of a photographic copying machine for an interval before the starting and after the stopping of a record handling means.

The preferred construction and arrangement of the photographic copying machine and record handling means are shown in the copending application of Alvin E. Schubert and Harvey P. Hintz, Serial No. 471,706, filed January 8, 1943, for Record handling and copying apparatus. However, the sequential control of the present invention is equally effective for any type of record handling means and photographic copying machine. While the aforementioned application discloses sequential stopping of a record handling and copying apparatus so that the copying machine is stopped only after the records therein have been photographed, it is also necessary and desirable to start the photographic copying machine for an interval prior to starting of the record handling means so that the copying machine will be up to normal speed for proper exposure and proper spacing of the records therein. Furthermore, the interval timing means or sequential control for stopping the record handling means prior to the photographic copying machine according to said copending application is of comparatively complicated and expensive construction.

The primary object of the present invention is the provision of a sequential control means for record handling and copying apparatus operative during starting of the apparatus to start said copying machine before the record handling means is started and operative upon stopping of said apparatus to stop the record handling means before said copying machine is stopped.

Another object of the invention is the provision of a sequential control for starting the copying machine before the record handling means is started.

A further object of the invention is the provision of a sequential control means and of a protective means for rendering said sequential control inoperative during normal operation of the apparatus or after the apparatus has stopped.

Still another object of the invention is the provision of a sequential control means including a thermo-responsive member for delaying the starting of the record handling means until a predetermined time after the copying machine has been started and/or for maintaining the copying machine operative for a predetermined time after said record handling means has been stopped.

A still further object of the invention is the provision of a sequential control including an interval timer for maintaining operation of the copying machine for an interval before the record handling means is started and/or for maintaining operation of the copying machine for an interval after the record handling means is stopped.

Another object of the invention is the provision of a sequential control means including a thermo-responsive member and/or an interval timer assembly respectively for maintaining operation of the copying machine for an interval before the record handling means is started and/or for maintaining operation of the copying machine for an interval after the record handling means is stopped.

Other and further objects of the invention will be suggested to those skilled in the art by the description which follows:

The above and other objects of the invention are embodied in a sequential control for a photographic copying machine and for a record handling means for delivering records to said copying machine and including a timing assembly for maintaining the operation of the copying machine for an interval before said record handling means is started and including a second timing assembly for maintaining the operation of said copying machine for an interval after said record handling means has stopped, either or both of said timing assemblies being a thermoresponsive device or an interval timer. In order to preserve or prolong the life of such timing assemblies it is necessary that they be rendered inoperative during normal operation of the apparatus and after sequential stopping thereof. Furthermore, the thermoresponsive type of timing assembly can be of inexpensive but rugged construction to reduce the original cost and maintenance of the sequential control of the invention.

Reference is hereby made to the accompanying drawings wherein similar reference characters designate similar elements and wherein:

Fig. 4 is a fragmentary vertical longitudinal section through the apparatus and particularly showing details of the record handling means and photographic copying machine.

Fig. 5 is a fragmentary vertical section through the conveyer of the record handling means and particularly showing the arrangement of record controlled switches therein.

Fig. 6 is a wiring diagram showing one modification of a sequential control means including an interval timer for controlling the starting cycle and a thermo-responsive means for controlling the stopping cycle of the apparatus.

Fig. 7 is a wiring diagram of another modification of the sequential control and including interval timer assemblies for controlling the starting and stopping cycles of the apparatus.

Figure 1:
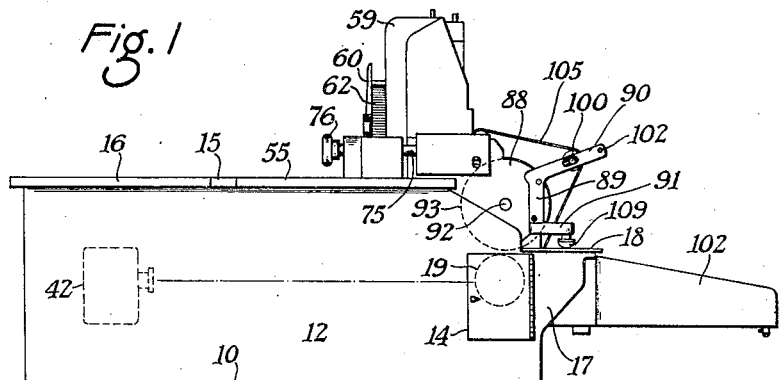
Fig. 1 is a side elevation of a record handling and copying apparatus according to the invention.

Although the record handling means and/or photographic copying machine to be sequentially controlled according to the invention may assume any of the several known forms, the photographic copying machine is preferably of the continuous type, such as the well known Recordak. In the illustrated embodiment of the invention, the copying machine is enclosed in a casing 10 having a four-legged standard 11, side walls 12 and 13 each provided with a hinged door 14, a top cross piece 15, and a hinged rear cover 16. At the front of the machine the casing 10 is provided with a pair of brackets 17 supporting a horizontal ledge 18. The document feed of the copying machine comprises a rotatable member preferably in the form of a drum 19 and rotatably mounted by ball bearings 20 on a shaft 21. Brackets 22 mounted on side walls 12 and 13 support a guide shield 23 which carries forwardly extending and upwardly inclined guide strips 24 and also a pair of bearing blocks 25. A shaft 26 is journaled in said blocks 25 and carries rollers 27 for engaging the surface of the drum 19. A transparent strip 28, preferably of glass, is mounted in the casing 10 adjacent the surface of drum 19 and holds the documents or records thereagainst during copying in the photographic field. The document path of the copying machine from said photographic field consists of the document engaging surfaces of drum 19 and a plurality of rollers 29 mounted on the back of arcuate guide plates 30 and spring pressed through openings therein by springs 31 against the surface of drum 19. The arcuate guide plates 30 are mounted by means of screws 32 upon side plates 33 fastened to side walls 12 and 13 by bolts 34. The entrance of the document feed of the photographic copying machine is thus provided between the drum 19 and guide strips 24 and is located adjacent the open front of the casing 10 of the copying machine.

The aforementioned photographic field may be illuminated in any known manner but is preferably lighted by a bank of incandescent lamps 35 mounted in sockets 36 and within a metal housing having fixed side walls 37 and a fixed back wall 38 which is provided with an exposure slot 39. An arcuate reflector 40 is mounted by a hinge 41 to said back wall 38 and is normally spring pressed into the position shown. For removal or insertion of incandescent lamps 35, the reflector 40 may be moved upwardly and afterwards will be returned to its operative position in which it directs the light from the lamp bank into the photographic field through transparent strip 28.

The camera 42 of the copying machine is of standard construction and has a supply film roll 43, a take-up roll 44 and an objective lens 45. A film strip F extends from the supply roll 43 to the take-up roll 44 over a drum 46. Said camera 42 is also provided in the usual manner with a normally open switch 47, see Figs. 3, 6 and 7, which is adapted to be closed unless the camera 42 is in its proper position and with normally open switches 48, 49 and 50 adapted to be closed in a known manner, respectively, when the supply film roll 43 is depleted, when the take-up film roll 44 is full, and/or when there is less of tension in the film strip F extending between rolls 43 and 44.

Figure 2:
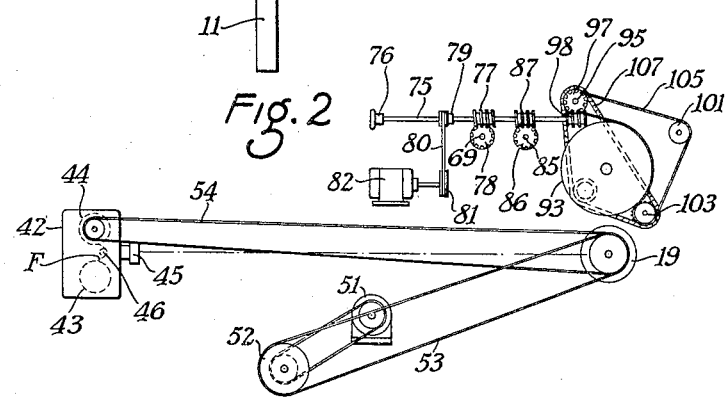
Fig. 2 is a diagrammatic illustration of the drives for the feeding means, copying machine and camera.

The driving means for the copying machine comprises a motor 51, see Fig. 2, which is preferably of the synchronous type and which is connected by a series of pulleys 52 and belts 53 to said drum 19. The camera 42 or film F therein is continuously driven in a known manner at a speed determined by the document speed, optical reduction, etc., and such drive is illustrated diagrammatically by a belt 54 extending between the drum 19 and the take-up roll 44. The operation of the copying machine is not unusual and documents introduced into the entrance of the document feed or between drum 19 and guide strips 24 with their record bearing faces upwardly will be photographed at considerable reduction onto the film F in the camera 42.

The feeding means comprises an intermittent feeder and a continuous conveyer with an arcuate path, both mounted upon a carriage also carrying a common drive means for the feeder and conveyer. Such carriage comprises a front cover 55 hinged to top cross piece 15 of the casing 10 for the copying machine and supporting a feeder frame 56.

The supply hopper of the feeder is formed by a front wall 57 of the frame 56 and carries polished tracks 58, by side walls 59, and by rear uprights 60 also having polished surfaces. The feeder frame 56 has a document support platform 61 on which a stack of documents 62 may be placed and a cover weight 63 is placed on top of the document stack 62 in the usual fashion.

The document platform 61 is provided with a pair of guideways for feeder head 64 and a picker assembly 65 including a knife 66 is swivelly connected to said feeder head 64. An arm 67 is pivotally mounted on feeder frame 56 and has a slotted free end engaging a rod 68 extending crosswise of the feeder head 64. A crank shaft 69 carries crank pins, not shown, and a connecting rod 70 which is pivotally connected to arm 67. Said crank shaft 69 also carries a cam 71 for actuating a leaf spring 72 arranged to actuate in turn the plunger 73 of a micro switch 74.

A drive shaft 75 is journaled in the feeder frame 56 and carries a knob 76 for manual rotation thereof, see Fig. 2. Said drive shaft 75 carries a worm 77 meshing with a worm wheel 78 on said crank shaft 69 and also carries a pulley 79 connected by a belt 80 to the pulley 81 of a motor 82 which is preferably of the synchronous type and mounted on the underside of front cover 55, see Fig. 4.

When the motor 82 is operated, drive shaft 75 and crank shaft 69 are rotated and arm 67 and feeder heads 64 are reciprocated. The knives 66 of the picker assemblies or feeder heads 64 are set to engage the edge of only the lowermost document or card 62 on the platform 61. Such reciprocation of the feeder heads 64 moves such lowermost document of the stack 62 between a pair of rollers 83 and into and through the guiding throat 84. The lower roller 83 is driven and is mounted upon a shaft 85 which carries a worm wheel 86 meshing with a worm 87 on said drive shaft 75.

The record handling means may also include a continuous conveyer which has an arcuate path and which moves the documents continuously in spaced relation through such arcuate path and delivers them into the entrance of the document feed of the photographic copying machine. Said conveyer is mounted between side plates 88 which are mounted upon and extend from the feeder frame 56 and each of said side plates 88 carries a bracket 89 having an arm 90 and a foot 91. A shaft 92 is journaled in side plates 88 and carries a pair of wheels 93 having their peripheries covered with a frictional material. Polished and fixed guide members are mounted in between wheels 93 and between each of wheels 93 and side plates 88. Specifically, a polished guide member 94 has its ends fastened to feeder frame 56, and has a cylindrical intermediate portion concentric with but slightly below the peripheries of wheels 93.

The driving assembly of the continuous conveyer comprises a pair of endless belts extending around a series of pulleys and bearing against a part of the peripheries of wheels 93. There are three pairs of pulleys, only one of which is driven. A shaft 95 is also journaled between side plates 88 and carries a pair of pulleys, not shown, but arranged to engage a pair of idler rolls 96 mounted on a transverse shaft 97' which is also journaled in side plates 88. A worm wheel 97, see Fig. 2, is mounted on one end of shaft 95 and meshes with a worm 98 on the end of drive shaft 75. A sprocket 99 is mounted on the other end of shaft 95. A shaft 100 is mounted within slots in arms 90 and carries a pair of freely rotatable pulleys 101. A stay rod 102 is connected between the outer ends of arms 90. A shaft 103 is rotatably journaled in extensions, not shown, of brackets 89 and carries a pair of pulleys 104. A pair of endless belts 105 each encircle said pulleys on shaft 95, pulleys 101 on shaft 100 and pulleys 104 on shaft 103 with the belts running with a portion of each belt bearing against the peripheries of wheels 93 to form a circular arcuate path within the continuous conveyer. A sprocket 106 is mounted on the end of shaft 103 and an endless chain 107 encircles sprockets 99 and 106 so that shaft 103 and pulleys 104 are driven. Thus, the endless belts 105 are driven only at one point or by the pair of pulleys 104 so that the endless belts 105 are placed under tension only in those portions contacting the peripheries of wheels 93 or the records 62 therebetween. A sheet metal housing 108 is mounted upon one of side plates 88 and encloses the chain drive of the continuous conveyer just described.

The carriage assembly including the feeder, conveyer and common drive means therefor, fills the opening in the front of the casing 10 of the copying machine and is hinged so that it may be readily swung upwardly for inspection, adjustment and/or repair of the feeder, conveyer, and/or document feed of the copying machine. The operative position of such carriage assembly may be varied by adjustable means comprising resilient pads 109 mounted on the ends of screws 110 threaded into feet 91 and held in adjusted position by lock nuts 111.

A receiving means for the records is located adjacent the exit of the document feed of the copying machine and is adapted to accept the records consecutively without changing their sequence. Such receiving means includes a hopper having side walls 112 fastened to ledge 18 and a horizontal platform 113 supported from bracket 17 by a cross member 114. A follower assembly comprises a follower plate 115 having ears 116 on which rollers 117 are mounted and includes a central support 118 having a portion extending below platform 113 and carrying rollers 119 engaging the undersurface of platform 113. Said follower assembly is consequently movable along said platform 113 with follower plate 115 in upright position and said follower assembly is biased or normally urged toward the periphery of the document feeding drum 19 in a well understood manner, preferably by a weight, not shown.

An abutment means for the records or cards is positioned within the receiving means to engage the leading edge of the records and to arrange them in edgewise relationship within the receiving hopper. Such an abutment comprises polished flanges 120 fastened to the side walls 112 of the receiving hopper and spaced from the card supporting surface of platform 113 a distance corresponding to the dimension of the records in their direction of travel through the apparatus. For the purpose of insuring removal of the record from the document feed of the copying machine a stripper means may be provided. Specifically, stripper arms 121 are mounted on flanges 120, being preferably formed integrally with flanges 20, and extend downwardly preferably into recesses in the surface of drum 19. When the receiving hopper is full the depending portion of said central support 118 abuts against the plunger 122 of a normally closed switch 123 to open the same for initiating a stopping cycle of the apparatus as will be later explained.

The sequential control means of the present invention are operative during the starting cycle and stopping cycle of the record handling and copying apparatus. The initiation of such starting or stopping cycles may be caused or prevented by a plurality of other controls, some of which may be manually operated and others of which are necessary to unattended operation of the apparatus. Such other controls are the normally open switches of the camera 42 which are closed when the camera 42 is improperly located or upon occurrence of an improper film condition therein, a cranking assembly for winding a predetermined length of film through said camera 42 upon opening or closing of the rear cover 16 and preventing operation of the motor 51 of the copying machine, a full hopper control means to stop the apparatus or to prevent starting thereof when the receiving hopper is full, and/or a record controlled means operative to stop the apparatus or prevent starting thereof when there are no records or the records are improperly spaced in the record handling means.

The operating circuit of the copying machine motor 51 and the circuits providing the aforementioned manual or automatic controls are the same for all modifications of the invention and will now be described with respect to Figs. 3, 6 and 7. The main supply lines 124 and 125 are connected through fuses respectively to connector blocks 126 and 127.

The operating circuit for the copying machine motor 51 extends from main supply line 124 to connector block 126 through wires 128, 129 and 130 to a switch 131 and thence through a wire 132 to a connector block 133, wire 134, connector block 135, wire 136 to said motor 51, the other side of motor 51 is connected by a wire 137 to a connector block 138, wire 139, main switch 140, connector block 127 and the other main supply line 125. Thus, it will be seen that the energization of the copying machine motor 51 is principally controlled by the switch 131 but may also be controlled by the main switch 140. The operating circuit for the motor 82 of the record handling means extends from main supply line 124, connector block 126, wires 128, 129, and 130, switch 131, wire 132 and connector block 133 through a wire 141 to one side of said motor 82 and the other side of motor 82 is connected through a wire 142, switch contacts 143 and wire 144 to the wire 137 and thence in common with the operating circuit for the motor 51 to the main supply line 125. Thus, completion of the control circuit for said motor 82 requires closing of the switches 131 and 143.

The primary control circuit includes the sequential control means for starting the apparatus and which may have various forms but also includes several manually or automatically controlled switches responsive to a predetermined condition of the apparatus. Such control circuit extends from main supply line 124 through connector block 126, wire 128, switch arm 145 of a double-pole manually operable and normally open switch 146, wire 147, wire 148, connector block 149, wire 150, switches $R_1$, $R_3$ and 123, wire 151 and the timing assembly to be later described, the relay coil $R_2$, wire 152, wire 144 and wire 137 and thence in a manner already traced to the other main supply line 125. Such primary control circuit may be interrupted for any of several reasons.

For instance, improper location of or an abnormal film condition in the camera 42 closes in a known manner any one of switches 47, 48, 49 or 50 to complete a circuit from ground 153, the coil $R_3$ of a relay, connector block 154, the secondary winding 155 of a transformer T, connector block 156, any one of said switches 47, 48, 49, or 50 to ground 157. The primary winding 158 of said transformer T has one side connected through a wire 159 to connector block 138 and thence to main supply line 125 while the other side of said primary winding 158 is connected through a wire 160, through connector block 135, wire 134, wire 132, switch 131, wires 130, 129, 128, connector block 126 to the other main supply line 124. A buzzer 161 also connected to ground becomes operative upon the closing of this local camera circuit. Energization of said local circuit by closing of any of switches 47 to 50, inclusive, energizes the coil of relay $R_3$ and opens the normally closed switch $R_3$ of the primary control circuit.

The copying machine is preferably provided with an auxiliary film advancing means for winding a predetermined length of film through the camera for the purpose of winding a leader or film exposed while loading the camera onto the take-up and also for winding a predetermined length of film or trailer onto the take-up prior to opening of the camera. Such auxiliary winding means may be automatically operated and may be constructed as shown in Schubert U. S. Patent No. 2,161,391 granted June 6, 1939. The auxiliary film advancing means comprises a winding motor 162 connected through either of cam operated switches 163 or 164 and through a single pole double throw switch 165, which is automatically moved from one position to the other by respective opening or closing of the rear cover of the copying machine, and to the main supply line 125. In operation when said cover 16 is closed switch 165 is moved to complete the circuit through cam operated switch 163 and winding motor 162, such winding operation being interrupted after a predetermined length or leader has been wound through the camera 42 and by opening of said camera operated switch 163 which is accompanied by the closing of the camera operated switch 164. When the cover 16 is open the switch 165 will be returned to the position shown in Figs. 3, 6 and 7 whereupon the winding motor 162 is again energized to wind a length of film through camera 42 of the copying machine until cam operated switch 164 is opened. The coil of relay $R_1$ is connected in parallel with winding motor 162 and so as to be energized and de-energized therewith upon the operation of switches 163, 164 and 165 as just described. Since the normally closed switch $R_1$ of the primary control means is opened by energization of the relay coil $R_1$ it is not possible to start or maintain operation of the apparatus when the auxiliary film winding means is operative.

In a similar manner the primary control circuit is also interrupted when the receiving hopper is full and when, in a manner already described, the central support 118 engages plunger 122 to open switch 123 which is in series in the primary control circuit.

An automatic control is provided to stop the record handling means when there are no records or cards in the document path of the continuous conveyer or when the records or cards are improperly spaced therein. Such a control means is shown in some detail in Fig. 5 and preferably comprises a pair of bell cranks 166 pivotally mounted by screws 167 on one of side plates 88. One arm of each bell crank 166 projects through recesses in the polished guide member 94 and into the document path of the conveyer, the other arm of each bell crank 166 being located to engage and close the normally open switches 168. Said bell cranks 166 are placed in spaced relation along the document path of the conveyer and are located so that at least one of said switches 168 will be closed when properly spaced records 62 are moving through said document path and so that both of said switches 168 will be opened if there is improper spacing between said records or if there are no records 62 in the document path of the conveyer.

During normal operation of the record handling means the primary control circuit extends from main supply line 124, connector block 126, wires 128, 129 and 130, switch 131, wire 132, connector block 133, wire 141, either or both of switches 168, and a normally closed manually operable switch 169 to wire 148 and through the primary control circuit as previously described. It will now be evident that the switch arm 145 of the double-pole starting switch 146 is for the purpose of shunting the card-operated switches 168 for completion of the primary control circuit during starting and when there are no records or the records are improperly spaced to close at least one of switches 168. An improper spacing of the records or absence of records from the record handling means therefor opens both of switches 168 to interrupt the primary control circuit and to initiate sequential stopping of the record handling and copying apparatus in the same manner as is accomplished by closing of switches 47 to 50 and opening of switch R₃, by the operation of the auxiliary film winding means and opening of switch R₁, or by opening of switch 123 when the receiving hopper is full. Furthermore, the switch 169 may be manually opened to interrupt said primary control circuit.

As before mentioned, the sequential control means of the invention may be provided in any of several different forms. The preferred form of such sequential control means is illustrated in Fig. 3 and will now be described.

The preferred form of the sequential control means for the starting cycle is connected in the aforementioned primary control circuit and comprises a heater coil 170 in parallel with and adjacent to a thermo-responsive switch 171 which are connected by a wire 172 through a switch 173 and wire 174 to one side of the relay coil R₂, the other side of relay coil R₂ being connected in a manner previously traced by wires 152, 144, 137, etc. to the main supply line 125. The voltage drop in heater coil 170 may be sufficient to prevent energization of relay coil R₂ which is sufficient to operate the plunger 175 and the switches thereon. However, a variable resistance circuit may be provided to control the critical energization of coil R₂ and may comprise a switch 176 on plunger 175 and a variable resistance 177 which are shunted across the coil R₂. When the heater coil 170 has raised the temperature of the thermo-responsive switch 171 sufficiently to cause closing thereof, said heater coil 170 is shunted and the critical energization of the relay coil R₂ is provided so that plunger 175 is operated from the position shown in Fig. 3 to move switch arm 178 thereon to close switch contacts 143. Such closure of switch 143 completes the operating circuit for the motor 82 of the record handling means which thereby becomes operative after an interval or predetermined time following energization of the motor 51 of the photographic copying machine.

The heater coil 170 and thermo-responsive switch 171 may remain in the primary control circuit throughout its energization but the operation of such coil and switch and prolongation of their service period may be assured by providing a protective means to place them on open circuit after their functioning for sequential starting. Such protective means comprises a by-pass circuit comprising a wire 179 and switch 180 mounted on plunger 175. Movement of plunger 175 by energization of coil R₂ opens switch 173 to place heater coil 170 and thermo-responsive switch 171 on open circuit and closes switch 180 to maintain the primary control circuit through wire 179 and continued energization of coil R₂. At the same time switch 176 is opened to place the variable resistance 177 on open circuit to preserve its operability and life.

Figure 3:
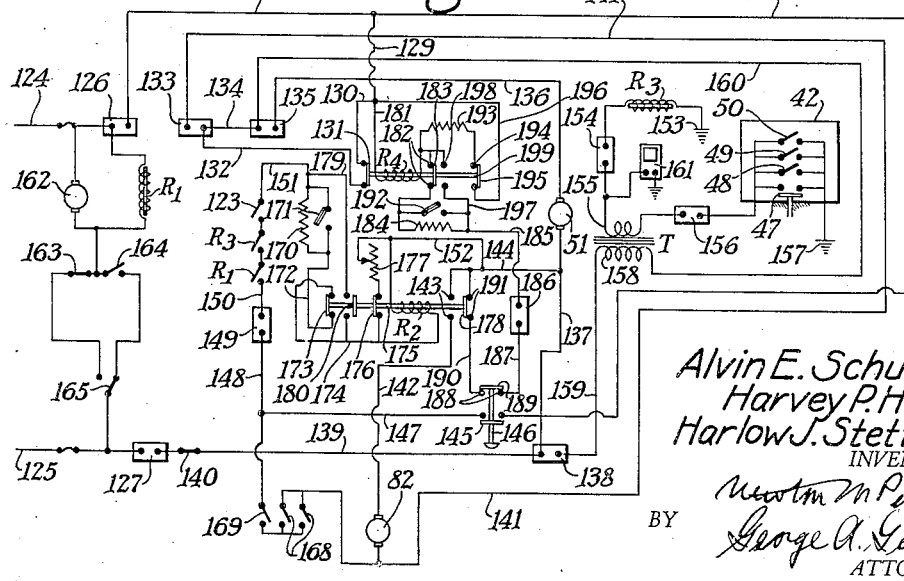
Fig. 3 is a wiring diagram showing the preferred form of the sequential control means of the invention.

The sequential control means for the stopping cycle may comprise a timing assembly including either a thermo-responsive member as shown in Figs. 3 and 6 or an interval timer assembly as shown in Fig. 7. The preferred form of the sequential control means for the stopping cycle is shown in Fig. 3 and comprises a relay coil R₄ having one side connected by a wire 181 to the wire 129 and thence to the main supply line 124. The other side of coil R₄ is connected through switch contacts 182 and a switch arm 183, through a heater coil 184, through a wire 185, connector block 186, wire 187, switch contacts 188 normally closed by the switch member 189 constituting the second pole of the manually operated switch 146, through a wire 190, switch contacts 191 adapted to be closed by the switch arm 178 on plunger 175, and thence through wires 144, 137, and in a manner already traced to the other main supply line 125. A thermo-responsive switch 192 is shunted across a heater coil 184 and is positioned so as to be heated thereby. As before, the voltage drop across heater coil 184 may be sufficient to prevent critical energization of relay R₄ or a loading resistance 193 may be connected through switch contacts 194, switch arm 195, and wire 196 in parallel with relay coil R₄. Also for the purpose of protecting the thermo-responsive timing assembly a wire 197 and switch contacts 198 are arranged to by-pass the heater coil 184 and thermo-responsive switch 192 when the plunger 199 of the relay R₄ assumes a position corresponding to energization thereof. Said plunger 199 of the relay R₄ carries switch arms 131, 183 and 195 and said plunger 199 is normally biased so as to close switch 131 and so that switch arms 183 and 195 respectively close switch contacts 182 and 194. When coil R₄ is energized, plunger 199 is moved to open the switches just mentioned and so that switch arm 183 closes switch contacts 198.

The operation of the sequential control means of the thermo-responsive type both for the starting and stopping cycles of the record handling and copying machine will now be described. Assuming that the apparatus is stopped, the plunger 175 and switches thereon of relay R₂ and the plunger 199 and switches thereof of relay R₄ will be in the positions shown in Fig. 3 and switch 131 is closed. Further assuming that the camera 42 is properly located and that all film conditions therein are normal, relay R₃ will be de-energized and switch R₃ will be normally closed. Also if the auxiliary film winding means is inoperative, switch R₁ will be normally closed. If the receiving hopper is not full, normally closed switch 123 will be closed. Manually operable switch 169 is normally closed and card-controlled switches 168 may be closed or opened depending respectively on whether or not there are cards in the record handling means. If both of switches 168 should be open, it will be necessary to press the plunger of the double-pole switch 146 so that switch arm 145 thereof engages the associated contacts. Under these conditions, the primary control circuit will be completed through the various switches just enumerated, heater coil 170, wire 172, switch arm 173, wire 174, relay coil R₂, which will not be energized to its critical value, wire 152, wire 144, wire 137, connector block 138, wire 139, main switch 140, connector block 127 to main supply line 125. At the same time the operating control circuit through the motor 51 for the copying machine is completed and the copying machine will start to operate. As soon as the heater coil 170 raises the temperature of thermo-responsive switch 171 so as to close the same then relay coil R₂ is energized at or above its critical value and plunger 175 is moved so that switch arm 178 bridges switch contacts 143. Such closing of switch contacts 143 completes the operating circuit to the motor 82 for the record handling means but the interval provided by the thermo-responsive assembly has been sufficient to permit the motor 51 and the photographic copying machine to attain a normal running speed and so that the records being fed from the record handling means into the photographic copying machine will be properly exposed and will be properly spaced because the copying machine and record handling means are operating at synchronous speeds. At the same time switch 173 is opened and switch 180 is closed to place the heater coil 170 and thermo-responsive switch 171 on open circuit and to close the by-pass wire 179 through switch 180. Also switch 176 is opened to open the circuit through variable resistance 177. The record handling means and photographic copying machine will continue to operate in this manner until some abnormal condition occurs or until normally closed switch 169 is manually opened.

Immediately upon the opening of any of switches 47 to 50, switches $R_1$, $R_3$, 123, 169 or both of switches 168, the primary control circuit is interrupted and relay coil $R_2$ is de-energized so that the plunger 175 returns to its normal position whereupon switch 178 dis-engages switch contacts 143 and the operating control circuit for the motor 82 of the record handling means is open and the record handling means stops immediately. The switch arm 178 in normal position of plunger 175 and upon de-energization of coil $R_2$ bridges switch contacts 191 and closes the control circuit through relay coil $R_4$ as follows: main supply line 124, connector block 126, wires 128, 129 and 181, relay coil $R_4$, switch contacts 182 and switch arm 183, heater coil 184, wire 185, connector block 186, wire 187, switch contacts 188 and switch member 189, wire 190, switch contacts 191 and switch arm 178, wire 144, wire 137, connector block 138, wire 139, main switch 140, connector block 127 to the other main supply line 125. As previously explained, the voltage drop in heater coil 184 and/or in the loading resistance 193 prevents coil $R_4$ from being critically energized. After an interval determined by the characteristics of heater coil 184 and of thermo-responsive switch 192, the latter is closed whereupon coil $R_4$ is critically energized and plunger 199 is moved from its normal position. Such movement of plunger 199 by critical energization of coil $R_4$ opens switch 131 which is in the operating circuit of the motor 51 for the photographic copying machine. Thus, the copying machine is shut down after an interval predetermined by the characteristics of the thermo-responsive timing assembly. At the same time switch 183 is moved to open switch contacts 182 and to close switch contacts 196 thus disconnecting heater coil 184 and thermo-responsive switch 192 but maintaining the circuit through contacts 196, wire 197, wire 185 and as previously traced to the other main supply line 125. Also, switch 195 has opened the circuit for the loading resistance 193.

Since switch 131 is maintained open by energization of coil $R_4$ after completion of the stopping cycle it is necessary to interrupt the circuit through coil $R_4$ in order to start the apparatus again. This is accomplished by the double-pole manually operated switch 146 which may be operated so that switch arm 145 by-passes the card controlled switches 168 and which also opens switch arm 189 to interrupt the circuit through coil $R_4$. Thus, as soon as an abnormal condition of the apparatus or film has been cleared, the manually operable switch 146 can be operated and the motor 51 will be started and the starting cycle will be initiated. As previously explained, the thermo-responsive timing assembly in the primary control circuit will cause relay coil $R_2$ to become energized after a predetermined interval whereupon the operating circuit of the motor 82 of the record handling means is completed. By the arrangement just described there is provided a very simple, inexpensive and effective arrangement of a sequential control means for starting the copying machine before the record handling means and for stopping the record handling means before the copying machine is stopped and also various protective devices to insure the operability and prolong the life of the heating elements or thermo-responsive members of said sequential control means.

The sequential control means of the invention may alternatively have an interval timer in the primary control circuit to predetermine the interval between energization of the copying machine motor 51 and the starting of the motor 82 for the record handling means. Such an arrangement is shown in Fig. 6 and introduces a few simple changes which will be described. The interval timer assembly is of standard construction and comprises a motor 200 arranged to move, after a predetermined interval of operation, a switch arm 201 from a normal position engaging a contact 202 into engagement with a contact 203. The primary control circuit in this modification of the invention extends from the switch 123, through connector block 204, through wire 205, through timer motor 200, through wires 206 and 207 and through wire 137 which may be readily traced to the main supply line 125. The other side of the primary control circuit has already been traced through switch arm 145 of manually operated switch 146 or through record controlled switches 168 to main supply line 124. The operating circuit for motor 51 of the photographic copying machine is also completed as previously described through switch 131 of relay $R_4$ and to the main supply lines 124 and 125. Thus, motors 51 and 200 will start operation simultaneously, it being understood, of course, that all of the manual or automatically controlled switches of the primary control circuit are closed. However, the operating circuit for the motor 82 of the record handling means is not closed until after the interval required for timer motor 200 to move switch arm 201 into engagement wtih contact 203 whereupon motor 82 is connected by wire 208, contact 203, switch arm 201, wire 207, and thence to main supply line 125, the other side of motor 82 being readily traceable back through switch 131 to the other main supply line 124. In this manner sequential starting of the copying machine at a predetermined interval prior to operation of the record handling means is obtained. When the primary controlled circuit is opened by reason of the opening of switches therein, timer motor 200 is de-energized and switch arm 201 immediately returns to its normal position in engagement with contact 202, thus breaking the circuit through the motor 82 of the record handling means which therefore stops immediately. The motor 51 of the copying machine, however, continues to operate for an interval determined by the thermo-responsive timing assembly similar to that shown in Fig. 3 and to be briefly mentioned. The control circuit for the stopping cycle extends from main supply line 124 through connector block 126, wires 128, 129 and 181 through coil $R_4$, switch contacts 182, switch arm 183, heater coil 184, wire 185, switch contacts 188 and switch arm 189, wire 190, contact 202, switch arm 201, wire 207, wire 137, connector block 138, wire 139, main switch 140, and connector block 127 to the other main supply line 125. The voltage drop of heater coil 184 and/or of loading resistance 193 prevents critical energization of coil R4 so that switch 131 remains closed until such time as thermo-responsive switch 131 is heated enough to close. Whereupon, plunger 199 is moved to open switch 131 and the operating circuit for the copying machine motor 51. At the same time switch arm 183 opens switch contacts 182 and closes switch contacts 198 to by-pass heater coil 184 and thermo-responsive switch 192 and switch 195 is opened to open the circuit to the loading resistance 193. Energization of the coil of relay R4 may be maintained to keep switch 131 open and prevent starting of the motor 51 when renewal of operation is desired. Consequently, switch arm 189 of the manually operable switch 146 may be opened simultaneously with closing of starting switch arm 145 to permit the closing of switch 131 and the repetition of the cycles just described.

Although interval timer motors as now provided are not impaired to any extent by being stalled upon the line as happens in the modification shown in Fig. 6, it is nevertheless deemed better practice to provide a protective means for bypassing the timer motor after its timing cycle has been completed. The modification of the invention shown in Fig. 7 provides such a protective means for the interval timer assembly for the starting cycle and also provides an interval timer assembly for the stopping cycle. While the interval timer for the stopping cycle is not shown with a protective means it is to be understood that such protective means may be provided in the same way as is shown for the interval timer motor for the starting cycle.

Referring now to Fig. 7, the primary control circuit extends from switch 123 through wire 209 to connector block 210, wire 211, relay coil R2, wire 212, wire 213, connector block 138, wire 139 and connector block 127 to main supply line 125. The relay coil R2 has associated therewith a switch arm 214 which in normal position engages a contact 215 but which engages a contact 216 when said coil R2 is energized. When all operating conditions of the apparatus are satisfied and the primary control circuit closed to energize relay coil R2, switch arm 214 engages contact 216 to complete a timer motor control circuit through wire 217, connector block 218, wire 219, switch arm 220, switch contact 221, wire 222, timer motor 223, wire 224, wire 141, connector block 133, wire 132, normally closed switch 225 operated by a second timer motor 226, wire 227 to connector terminal 126 and the other side of main supply line 124. Since the switch 225 of the second interval timer assembly is closed the operating circuit to motor 51 is also closed simultaneously with completion of the primary control circuit and energization of the coil of relay R2. When switch arm 214 engages contact 216 to complete the circuit just traced, timer motor 223 is energized and after a predetermined interval closes its associated normally open switch 228. Such closing of switch 228 completes the operating circuit for the motor 82 of the record handling means, such operating circuit extending from one side of switch 228 through a wire 229, connector block 218, wire 217, contact 216, switch arm 214, wire 213, and connector block 138 to main supply line 125, the other side of switch 228 being connected by a wire 230 and wire 231 to one side of the motor 82 for the record handling means and thence through wire 141 as just traced to the other main supply line 124.

The protective means for said timer motor 223 comprises a circuit completed by switch 228 and extending through wires 230, relay coil R5 and wire 232 to wire 141 back to the main supply line 124. Completion of this protective circuit energizes coil R5 and moves switch arm 220 from engagement with switch contact 221 to open the circuit to the timer motor 223 but at the same time to maintain the control circuit by moving switch arm 220 into engagement with a switch contact 233 which now completes the operating circuit for motor 82 from connector block 218 through wire 219, switch arm 220, switch contact 233, wire 231 to motor 82. Thus, circuit for timer motor 223 is opened but the operating circuit for motor 82 and the protective circuit including relay coil R5 is maintained. As before, any interruption of the primary control circuit either by manually operated switch 169 or by any of the switches R1, R3, or 123 will open the primary control circuit whereupon switch 220 opens the operating circuit to motor 82, de-energizes coil R2 and switch arm 214 returns to normal engagement with switch contact 215.

When switch arm 214 engages switch contact 215 the circuit to the second timer motor 226 is completed from main supply line 124, connector block 126, wire 227, timer motor 226, connector block 234, wire 235, contact 215, switch arm 214, wire 213, connector block 138, wire 139 and connector block 127 to the other main supply line 125. Although the operating circuit for motor 82 has been interrupted, the operating circuit for motor 51 of the copying machine is maintained through timer assembly switch 225 until said timer motor 226 has operated for a predetermined interval and opened said switch 225. Opening of switch 225 interrupts the motor operating circuit for motor 51 and stops the copying machine. The starting cycle may again be initiated when the primary control is closed as by closing starting switch 145. Completion of the primary control circuit energizes the coil of relay R2, moves switch arm 214 out of engagement with contact 215 to interrupt the circuit of timer motor 226 whereupon switch 225 is immediately moved to its normally closed position. It should be noted that the switch 228 associated with timer motor 223 is normally open until after a predetermined interval of operation of said timer motor 223, while switch 225 associated with timer motor 226 is normally closed until after a predetermined interval of operation of timer 226 to open said switch 225. Furthermore, when the timer motor of these assemblies is deenergized the switches return to their normal position in a well understood manner. The energization of coil R2 by completion of the primary control circuit initiates the sequence of events previously described to energize timer motor 223 to close switch 228, to energize motor 82 and coil R5 for protection of timer motor 223.

From the foregoing disclosure it will be evident that the sequential control means of the invention may be provided either with a thermo-responsive timing device for the starting or stopping cycle or with an interval timing device for the starting or stopping cycle. Furthermore, other timing devices may be used for obtaining the sequence of control herein described without departing from the scope of the present invention. Other modifications of the operating means and control means may be provided by those skilled in the art, but it is to be understood that the scope of the invention is not limited by the illustrated embodiments, but only by the claims which follow.

Having now particularly described our invention, what we desire to secure by Letters Patent of the United States and what we claim is:

1. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means operative during starting and stopping of said apparatus to maintain operation of said camera, drive connection and record moving means of the copying machine for an interval before the starting and after the stopping of said record handling means.

2. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records in edge-to-edge relation to said record moving means of the copying machine, of a control means operative during the starting of said apparatus to start said camera, drive connection and record moving means of the copying machine before said record handling means is started and operative upon stopping of said apparatus to stop said record handling means before said camera, drive connection and record moving means of the copying machine is stopped.

3. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means operative during the starting cycle of said apparatus to start said camera, drive connection and record moving means of the copying machine before said record handling means is started, and means responsive to the sequential starting of said copying machine and record handling means and for rendering said sequential control means inoperative.

4. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means including a thermo-responsive member energized upon starting of said copying machine and providing an interval delaying the starting of said record handling means until a predetermined time after said camera, drive connection and record moving means of the copying machine has been started.

5. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means including a timing assembly energized upon starting of said copying machine and maintaining operation of said camera, drive connection and record moving means of the copying machine for an interval before said record handling means is started and including a second timing assembly energized upon stopping of said record handling means and maintaining the operation of said camera, drive connection and record moving means of the copying machine for an interval after said record handling means has stopped.

6. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means including a thermo-responsive member energized upon stopping of said record handling means and maintaining the camera, drive connection and record moving means of the copying machine operative for a predetermined time after said record handling means has stopped.

7. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, a separate record handling means operably independent of said copying machine and for delivering records to said record moving means of the copying machine, of a sequential control means including an interval timer assembly energized upon starting of said copying machine and maintaining operation of said camera, drive connection and record moving means of the copying machine for an interval before said record handling means is started.

8. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means including an interval timer assembly energized upon stopping of said record handling means and maintaining the operation of said camera, drive connection and record moving means of the copying machine for an interval after said record handling means has stopped.

9. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means including a timing assembly energized upon starting of said copying machine and maintaining the operation of said camera, drive connection and record moving means of the copying machine for an interval before said record handling means is started and including a second timing assembly energized upon stopping of said record handling means and maintaining the operation of said camera, drive connection and record moving means of the copying machine for an interval after said record handling means has stopped, one of said timing assemblies being a thermo-responsive device and the other of said timing assemblies being an interval timer.

10. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a relay means including a coil and a switch assembly, a control circuit including a timing assembly and said coil and switch assembly, an operating circuit closed by said switch assembly after an interval determined by said timing assembly following energization of said control circuit, operating said record handling means, and adapted to be opened by interruption of said control circuit, and a second control circuit controlling said copying machine completed by said switch assembly when said operating circuit is opened and including a timing assembly for rendering said camera, drive connection and record moving means of the copying machine inoperative after an interval following completion of said second control circuit.

11. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a relay means including a coil and a switch assembly, a control circuit controlling said copying machine and including a timing assembly and said coil and switch assembly, and an operating circuit closed by said switch assembly after an interval determined by said timing assembly and following energization of said control circuit, operating said record handling means, and adapted to be opened by interruption of said control circuit.

12. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means operative during starting and stopping of said apparatus to maintain operation of said camera, drive connection and record moving means of the copying machine for an interval before the starting and after the stopping of said record handling means, and protective control means adapted after said sequential starting of said camera, drive connection and record moving means of the copying machine and said record handling means to render said sequential control means inoperative again to start said machine until after said apparatus has stopped.

13. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means operative during starting and stopping of said apparatus to maintain operation of said camera, drive connection and record moving means of the copying machine for an interval before the starting and after the stopping of said record handling means, and protective control means adapted upon stopping of said record handling means to render said sequential control means inoperative again to stop said record handling means until after said camera, drive connection and record moving means of the copying machine is started.

14. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control means operative during starting and stopping of said apparatus to maintain operation of said record moving means of the copying machine for an interval before the starting and after the stopping of said record handling means, and protective control means adapted after a sequential starting or stopping of said camera, drive connection and record moving means of the copying machine and said record handling means to render said sequential control means inoperative to repeat such starting or stopping sequence until after the other sequence has been completed.

15. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control circuit including a timing assembly and a relay coil and operative during starting of said apparatus to maintain operation of said camera, drive connection and record moving means of the copying machine for an interval before the starting of said record handling means, and a protective control circuit including a switch member closed by energization of said relay coil and for rendering said timing assembly inoperative during operation of said record handling means and until said relay coil is de-energized.

16. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a relay means including a coil and a switch assembly, a control circuit including a timing assembly and said coil, a protective circuit including said switch assembly and for shunting said timing assembly, and an operating circuit for said record handling means closed by said switch assembly after an interval determined by said timing assembly and following energization of said control circuit, said switch assembly closing and opening said protective circuit as said operating circuit is closed and opened.

17. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a sequential control circuit including a timing assembly and a relay coil and operative during stopping of said apparatus to maintain operation of said camera, drive connection and record moving means of the copying machine for an interval after the stopping of said record handling means, and a protective control circuit including a switch member which is closed by energization of said relay coil to render said timing assembly inoperative until said relay is deenergized.

18. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a relay means including a coil and a switch assembly having a plurality of elements, a control circuit including a timing assembly and said coil, a protective circuit including an element of said switch assembly and for shunting said timing assembly, and an operating circuit for said camera, drive connection and record moving means of the copying machine and opened by another element of said switch assembly after an interval determined by said timing assembly following energization of said control circuit, the elements of said switch assembly being moved simultaneously to open said operating circuit and to close said protective circuit.

19. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a control circuit, including a timing assembly and a switch member adapted to be opened by an abnormal condition of the materials in said apparatus, and an operating circuit for said record handling means and adapted to be closed after an interval determined by said timing assembly, said control circuit and in turn said operating circuit being rendered inoperative by said switch member being opened during said abnormal condition of the materials in said apparatus.

20. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of a control circuit including a timing assembly and a relay coil, and an operating circuit for said camera, drive connection and record moving means of the copying machine and including a relay switch adapted to be opened after an interval following energization of said control circuit and determined by said timing assembly, and a starting switch in said control circuit for interrupting said control circuit to de-energize said relay coil and permit said relay switch to close.

21. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering cards to said record moving means of the copying machine, of a main control circuit including a switch member adapted to be opened by an abnormal condition of the records in said record handling means, an auxiliary control circuit including a timing assembly and a relay coil, an operating circuit for said record moving means of the copying machine and including a relay switch adapted to be opened after an interval following energization of said auxiliary control circuit and determined by said timing assembly, and a starting switch assembly movable simultaneously to close said main control circuit and to open said auxiliary control circuit for starting of said record moving means of the copying machine.

22. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering cards to said record moving means of the copying machine, of a control circuit supervising sequential operation of said record moving means and said record handling means and including a relay assembly operative only upon a critical energization thereof and a timing assembly comprising a bimetallic switch arm and a heating coil adjacent thereto and adapted to be shunted by said switch arm, the resistance of said heating coil being sufficient to prevent critical energization of said relay assembly until said bimetallic switch is operated.

23. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering cards to said record moving means of the copying machine, of a control circuit supervising sequential operation of said record moving means and said record handling means and including a relay assembly operative only upon a critical energization thereof and a timing assembly comprising a bimetallic switch arm and a heating coil adjacent thereto and adapted to be shunted by said switch arm, and a loading resistance in parallel with the coil of said relay assembly and for drawing a current sufficient to energize said heater coil for operation of said bimetallic switch arm when not sufficient for critical energization of said relay coil.

24. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering cards to said record moving means of the copying machine, of a relay assembly including a coil having a critical energization value and a switch member movable from one position to another by critical energization of said coil, a control circuit supervising sequential operation of said record moving means and said record handling means and including a timing assembly comprising a normally opened bimetallic switch arm and a heating coil adjacent thereto and adapted to be shunted thereby and including the coil of said relay assembly and adapted to be completed by the switch member thereof, and a protective circuit including the switch member of said relay assembly and for shunting said heating coil and bimetallic switch arm when the relay coil is energized to or above its critical energization value.

25. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering cards to said record moving means of the copying machine, of a control circuit supervising sequential operation of said record moving means and said record handling means and including a timing assembly comprising a motor and a switch member moved thereby from one position to a second position, an operating circuit for said record handling means and adapted to be closed after an interval following energization of said control circuit and upon movement of said switch member to its second position, and a switch means in said control circuit and responsive to an abnormal condition of the materials in said apparatus to open said circuit whereupon said switch member returns to its first position.

26. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering cards to said record moving means of the copying machine, of two relay assemblies each having a coil and a switch member movable thereby to either of two operative positions, a timing assembly including a timer motor and a normally open switch adapted to be closed by operation of said motor, a main control circuit supervising sequential operation of said record moving means and said record handling means and including one relay coil and adapted to be closed by the associated switch member, a timer control circuit completed by movement of said switch member upon energization of said one relay coil and including said timer motor, a protective control circuit including said normally opened switch and the coil of the second relay assembly and completed after an interval following energization of said timer motor, and an operating circuit for said record handling means and completed by the switch member of said second relay assembly which simultaneously interrupts said timer control circuit.

27. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means of the copying machine, of two relay assemblies each having a coil and a switch member movable thereby to either of two operative positions, a timing assembly including a timer motor and a normally opened switch adapted to be closed by operation of said motor, a main control circuit supervising sequential operation of said record moving means and said record handling means and adapted to be interrupted when an abnormal condition exists in the materials in said apparatus and including the coil of one relay assembly, a timer control circuit completed by a movement of the associated switch member upon energization of said one relay coil and including said timer motor and a switch member of said second relay assembly, a protective control circuit including said normally opened switch and the coil of a second relay assembly and completed after an interval following energization of said timer motor, and an operating circuit for said record handling means and completed by the switch member of the second relay assembly which simultaneously interrupts said timer control circuit, said switch member of the second relay assembly being adapted and arranged upon energization of said operating circuit to maintain energization of the coil of said second relay assembly although said normally opened switch is opened upon interruption of said timer control circuit.

ALVIN E. SCHUBERT.
HARVEY P. HINTZ.
HARLOW J. STETTNER.